Figure 1:
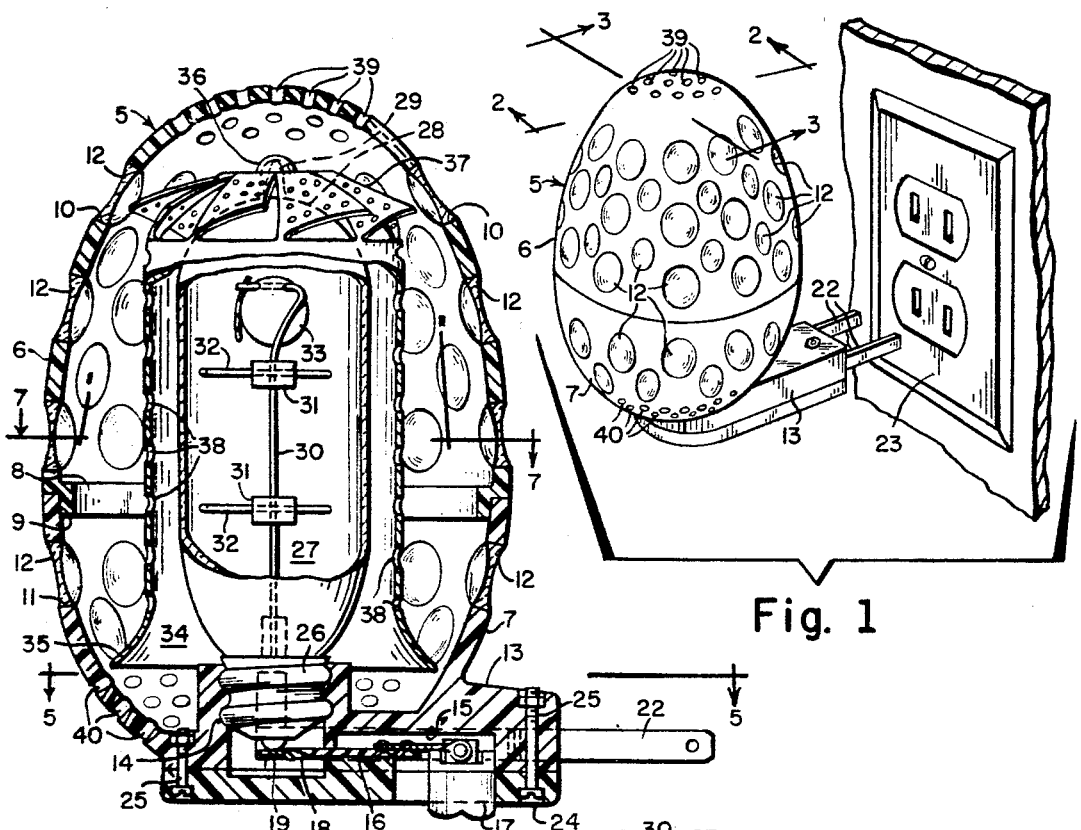

July 16, 1968      V. B. REAM      3,393,310

ORNAMENTAL DISPLAY DEVICE

Filed Dec. 10, 1965      2 Sheets-Sheet 1

*INVENTOR.*
VINCENT B. REAM

BY

*ATTORNEY*

July 16, 1968 V. B. REAM 3,393,310
ORNAMENTAL DISPLAY DEVICE
Filed Dec. 10, 1965 2 Sheets-Sheet 2
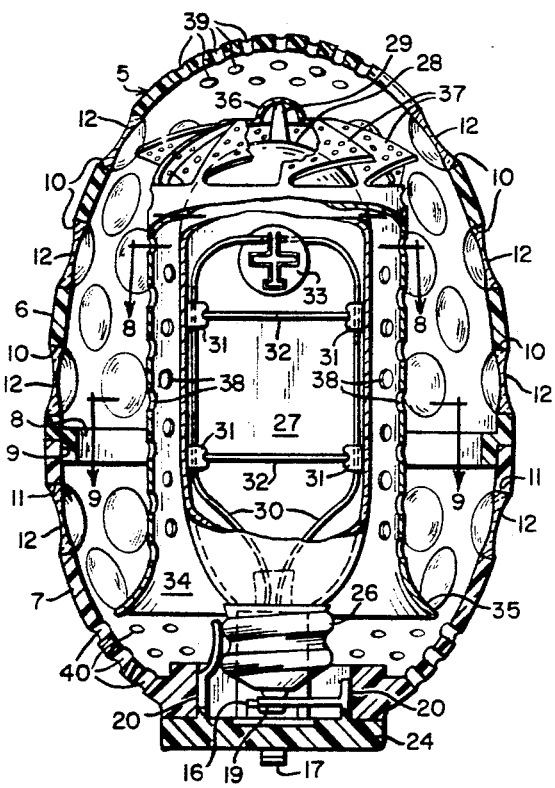
Fig. 3
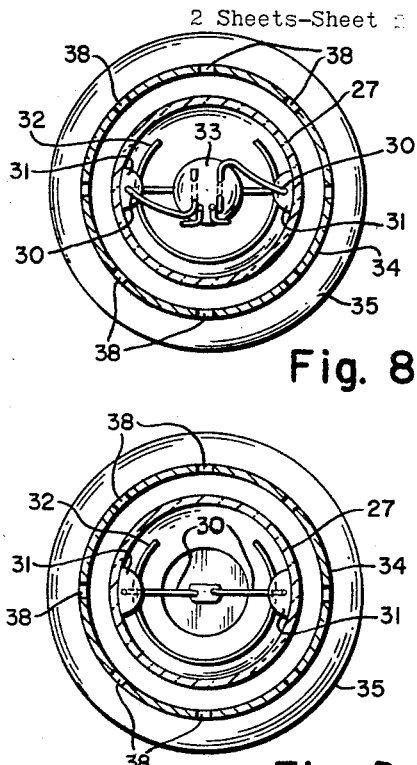
Fig. 8
Fig. 9
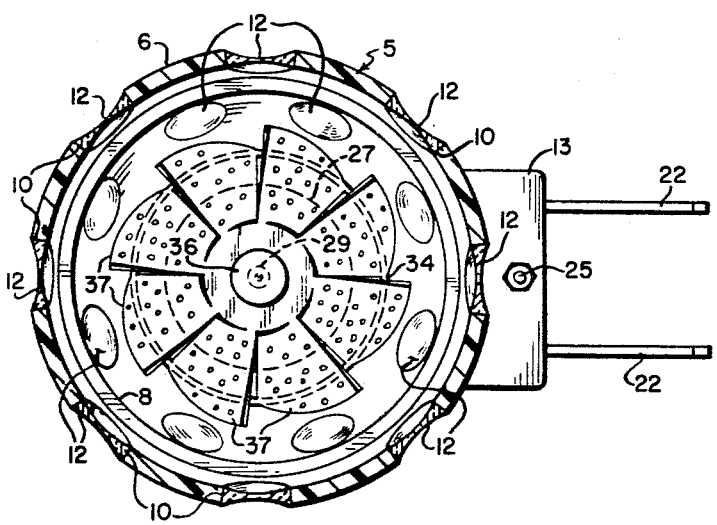
Fig. 7
INVENTOR.
VINCENT B. REAM
BY
ATTORNEY

United States Patent Office 3,393,310
Patented July 16, 1968

3,393,310
ORNAMENTAL DISPLAY DEVICE
Vincent B. Ream, 8476 Faith Home Road,
Hilmar, Calif. 95324
Filed Dec. 10, 1965, Ser. No. 513,133
5 Claims. (Cl. 240—10)

This invention relates to an ornamental display device wherein a multiplicity of segments are projected upon wall areas and with the device being plugged into a wall socket to illuminate an electric lamp within a housing constituting a part of the invention.

The device embodies a generally egg-shaped housing formed in upper and lower sections that are detachably connected together intermediate their length and with the sections of the housing being provided with a multiplicity of magnifying lens forming openings and with the lamp being connected to a socket that is molded to the lower portion of the housing and carrying an illuminated figure, such as the outline of an aircraft, animals or other desirable features that are adapted to be projected through the lens openings and projected upon the wall area and with the socket for the lamp being provided with prongs that have fitment within a socket of a wall opening and also provided with a contact switch for illuminating the filaments of the lamp and the article to be projected.

The invention further contemplates a device having the above noted characteristics wherein a cylindrical shield is seated upon a pin projecting above the lamp and with means carried by the shield whereby the shield is rotated under the influence of heat generated by the lamp and with the shield having its side wall perforated to permit the passage of the article to be projected and to be projected through the lens opening.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
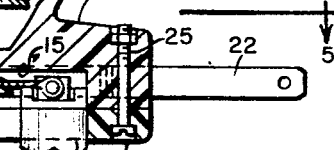
Figure 4:
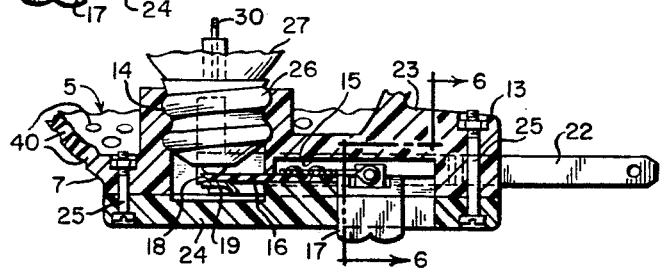
Figure 5:
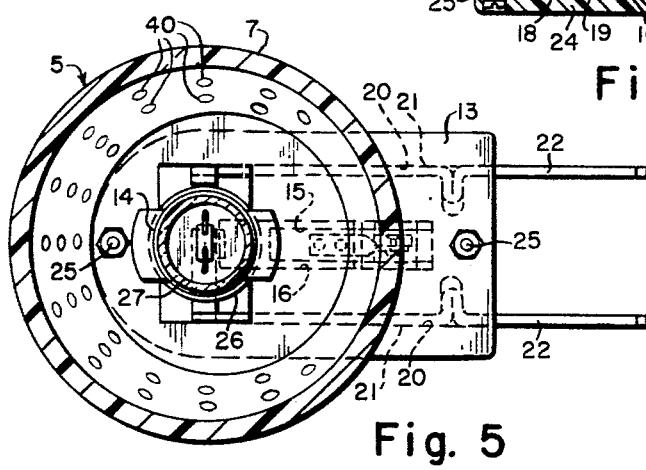
Figure 6:
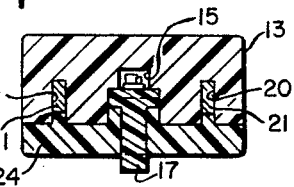

In the drawings:

FIGURE 1 is a perspective view of a device constructed in accordance with the invention and shown adjacent to a wall socket, FIGURE 2 is a central vertical section, taken substantially on line 2—2 of FIGURE 1, FIGURE 3 is a central vertical section taken at right angles to FIGURE 2 and on line 3—3 of FIGURE 1, FIGURE 4 is a sectional view through a lower portion of the housing, illustrating a switch device in the off position, FIGURE 5 is a horizontal section taken substantially on line 5—5 of FIGURE 2, FIGURE 6 is a section taken substantially on line 6—6 of FIGURE 4, FIGURE 7 is a horizontal section taken substantially on line 7—7 of FIGURE 2, FIGURE 8 is a section taken on line 8—8 of FIGURE 3, and FIGURE 9 is a section taken on line 9—9 of FIGURE 3.

Referring specifically to the drawings, there has been illustrated a molded housing 5, formed in upper and lower sections 6 and 7. The sections 6 and 7 are connected together by flange 8, formed upon the upper section 6 that has fitment frictionally into an open upper end 9 of the lower section 7. The sections 6 and 7 are preferably molded of a suitable plastic and the walls of the sections 6 and 7 are apertured at 10 and 11 and magnifying lenses 12 are fitted into these openings and the openings 11 of the lenses 12 are disposed over the major area of the housing.

Formed integral with the lower section 7, is a molded extension 13, having a threaded socket 14 and grooved at 15 for the slidable reception of a switch plate 16 that is movable and a switch knob 17, that projects downwardly, for manual control. The plate 16 is beveled at its inner end as indicated at 18 to slidably engage a contact 19. The extension 13 is further grooved at 20, adjacent each side to receive bars 21 formed integral with prongs 22, that have pronged engagement within openings in a receptacle 23, constituting the source of electrical energy for a lamp device, to be described. The extension 13 is covered by a plate 24, fixed to the extension 13, by bolts 25 and whereby to cover the switch plate 16 and the bars 21 to prevent displacement thereof.

Threaded within the socket 14, is a threaded ferrule 26 of a lamp 27. The lamp 27 is formed of glass or plastic, having a rounded top portion 28 that is provided with an upstanding sharpened and axially arranged stud 29. Filament wires 30 are molded into the ferrule 26 in a conventional manner. The filaments 30 are fitted into the lamp 27 and pass through apertured beads 31 and the beads 31 are grooved to receive tension springs 32, whereby to clamp the filaments against the inner side of the lamp 27. The filaments extend above the uppermost beads 31 and pass through a preferably glass bead 33 where they take the shape of the article to be projected through the housing 5, such as an airplane, an animal or any other desirable configuration.

Overlying the lamp 27 and concentric thereto in spaced relation, is a rotatable shield 34, flared at its bottom as indicated at 35 and with the top of the shield 34 being provided with a socket 36, that is supported upon the pin 29. The top of the shield 34 is stamped to provide louvers 37 that constitutes the rotating means for the shield under the influence of heat generated by the filaments 30. The side walls of the shield 34 are apertured as indicated at 38 and whereby the illumination from the filaments 30 and especially the figure illustrated at 33 and that pass through the lens 12 as the device rotates and whereby to project the figure of the airplane or the like to adjacent side walls of a room adjacent to the device. The upper and lower ends of the housing members 6 and 7 are perforated at 39, for the flow of air through the device, with the air entering lower apertures 40 and traversing the shield 34 and through the louvers 37, causing the shield 34 to rotate and pass outwardly through the apertures 39 of the upper housing section 6.

In the use of the device, the lamp having been assembled with respect to the filaments 30 and the bead 33 and prior to the assembly of the housing sections 6 and 7, the shield 34 is fitted over the lamp 27 to rest upon the pin 29. The lamp is also threaded into the socket 14 in contact with a well known conducting element and the housing sections 6 and 7 are then connected together by a flange 8 and, with the prongs 22 seated within the grooves 20 and the cover plate 24 fixed thereto, the entire assembly as illustrated in FIGURE 1 is connected to the socket member 23. The switch knob 17 is shifted toward and from an operating position, moving the plate 16 to a contacting position with respect to the plate 19, energizing the lamp and, as the lamp is heated, the shield 34 rotates and the configuration of the bead 33 is illuminated by the filaments 30 and will be projected through the apertures 38 and then projected by the lens 12 to a wall area.

The device is therefore relatively simple, is strong, durable and most effective as an ornamental display device and for projecting various forms of apparatus upon adjacent walls or ceilings.

It is to be understood that the invention is not limited to the precise construction shown, but that changes are contemplated as readily fall within the spirit of the invention as shall be determined by the scope of the subjoined claims.

I claim:

1. An ornamental display device that comprises a hollow housing of generally egg-shape having upper and lower sections that are detachably connected, the lower section being provided with a threaded socket and an outward integral extension, a pair of spaced apart flat bars fitted into grooves formed on the extension and projecting beyond the extension to constitute plug-in prongs for a wall receptacle, a switch disposed within the extension and movable into the socket, each of the sections being provided with a multiplicity of apertures and magnifying lenses disposed in each aperture, an illuminating lamp having a threaded lower end for engagement in the socket, a cylindrical shield overlying the lamp in spaced apart relation and rotatable upon a sharpened stud formed upon the upper end of the lamp, means carried by the shield at its upper end for permitting the heat from the lamp to pass upwardly and to rotate the shield, the side walls of the shield being apertured to permit the passage of light from the lamp to be projected through the magnifying lenses upon a wall area and to project the shape of a figure formed upon filaments of the lamp to be projected in magnified form upon the wall and a multiplicity of apertures formed in the upper and lower ends of the sections to permit the flow of air to and from the lamp.

2. An ornamental display device of the character described that comprises an egg-shaped housing formed in upper and lower sections that are frictionally connected together, the lower section being provided with a centrally arranged upwardly extending threaded socket for the threaded reception of an elongated lamp, the lower section being provided with an integral extension at one side that is grooved to receive flat bars that extend to the lamp socket, the bars extending from a free end of the extension to constitute prongs for fitment into a wall socket, a switch plate slidable in a recess of the extension and movable by a switch knob, the bars and the switch plate effectively energizing the lamp socket and a ferrule carried by the threaded end of the lamp, the extension being open upon the bottom and covered by a fixed cover plate that is bolted to the extension to hold the bars and the switch plate, the housing sections being provided with a multiplicity of spaced apart apertures having magnifying lenses fixed therein, the lamp having filaments extending from its lower end and terminating in a figured device that is illuminated when the lamp is energized, the lamp upon its top and axially thereof having a molded sharpened stud, a cylindrical shield overlying the lamp for its full length and with the shield having an axial recess that seats upon the stud, the shield in its overlying relation to the lamp being spaced from the lamp, the side walls of the shield being apertured for the passage of light and the image that is illuminated by the filaments and whereby the illuminated figure is projected through the apertures of the shield and projected outwardly by the lens, the upper end of the shield being provided with a plurality of louvers whereby heat from the lamp causes the shield to rotate, the lower section of the housing being provided with air inlet openings and the upper end of the upper section being provided with air outlet openings.

3. The structure according to claim 2 wherein the filaments of the lamp extend upwardly substantially close to the side walls of the lamp and with the filaments being threaded through beads of non-conducting material and with the beads being grooved upon their inner sides to receive springs that force the beads against the side walls of the lamp.

4. The structure according to claim 2 wherein the housing and the extension are molded from plastic and with the shield being formed of metal, the lower open end of the shield being flared outwardly to receive air from the openings of the lower section to be guided upwardly between the shield and the lamp for rotating the shield by the louvers and whereby the air will escape from the openings formed in the upper end of the upper section.

5. The structure according to claim 4 wherein the filaments at their upper ends pass through a figure to be projected through the openings of the shield and the magnifying lenses to be magnified and projected upon adjacent wall areas of a room.

References Cited

UNITED STATES PATENTS

| | | |
|---|---|---|
| 2,166,790 | 7/1939 | Benander. |
| 2,521,851 | 9/1950 | Johnson _____ 240—10.1 |
| 2,608,779 | 9/1952 | Joy _____ 240—10.1 XR |
| 2,726,320 | 12/1955 | Damiano _____ 240—10.1 XR |
| 3,235,722 | 2/1966 | Burnbaum _____ 240—10.1 |

NORTON ANSHER, *Primary Examiner.*